(12) United States Patent
Levin

(10) Patent No.: US 7,682,471 B2
(45) Date of Patent: Mar. 23, 2010

(54) AUSTENITIC IRON-BASED ALLOY

(75) Inventor: Victor D. Levin, Highland Heights, OH (US)

(73) Assignee: TRW Automotive U.S. LLC, Livonia, MI (US)

( * ) Notice: Subject to any disclaimer, the term of this patent is extended or adjusted under 35 U.S.C. 154(b) by 619 days.

(21) Appl. No.: 11/483,882

(22) Filed: Jul. 10, 2006

(65) Prior Publication Data
US 2008/0006348 A1 Jan. 10, 2008

(51) Int. Cl.
| | |
|---|---|
| *B32B 15/01* | (2006.01) |
| *C22C 38/00* | (2006.01) |
| *C22C 38/18* | (2006.01) |
| *B23K 9/00* | (2006.01) |
| *B23K 9/02* | (2006.01) |
| *C22C 38/58* | (2006.01) |

(52) U.S. Cl. .............. 148/516; 148/325; 148/327; 219/121.46; 420/56; 420/64

(58) Field of Classification Search ......... 148/325, 148/327, 516; 420/56, 64; 219/121.46
See application file for complete search history.

(56) References Cited

U.S. PATENT DOCUMENTS

| | | | |
|---|---|---|---|
| 5,823,158 A | 10/1998 | Heimann, Jr. et al. | |
| 6,204,477 B1 | 3/2001 | Lai | |
| 6,248,292 B1 | 6/2001 | Ando et al. | |
| 6,385,847 B1 * | 5/2002 | Larson et al. | .......... 29/888.451 |
| 6,702,905 B1 | 3/2004 | Qiao et al. | |
| 6,781,083 B1 | 8/2004 | Keller et al. | |

FOREIGN PATENT DOCUMENTS

| | | | |
|---|---|---|---|
| DE | 1553841 | * | 2/1970 |
| DE | 19733306 | | 5/1999 |

\* cited by examiner

*Primary Examiner*—Roy King
*Assistant Examiner*—Caitlin Fogarty
(74) *Attorney, Agent, or Firm*—Tarolli, Sundheim, Covell & Tummino LLP

(57) ABSTRACT

The method of forming hard facing on an engine valve comprising providing an engine valve, providing an austenitic iron-based alloy, the austenitic iron-based alloy including, by weight, about 0.25% to about 0.9% carbon, about 1.5% to about 3.5% boron, about 1% to about 2% silicon, at least 20% chromium, an amount of manganese effective to provide the iron-based alloy with an austenitic structure, and the balance including iron and incidental impurities, and welding the austenitic iron-based alloy to at least a portion of the engine valve.

5 Claims, 3 Drawing Sheets

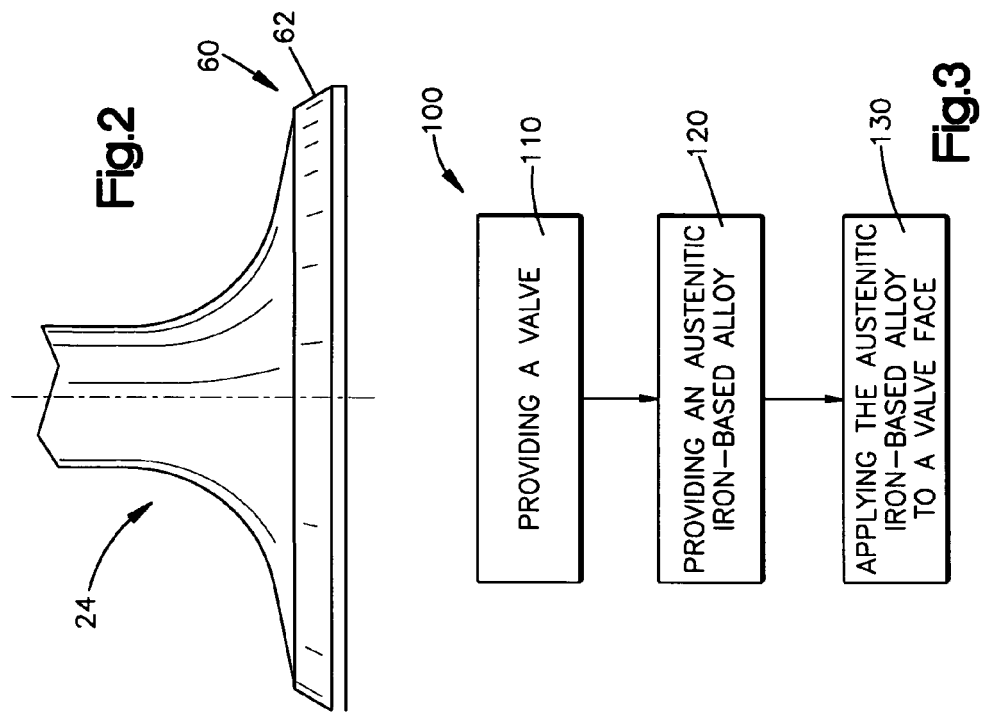
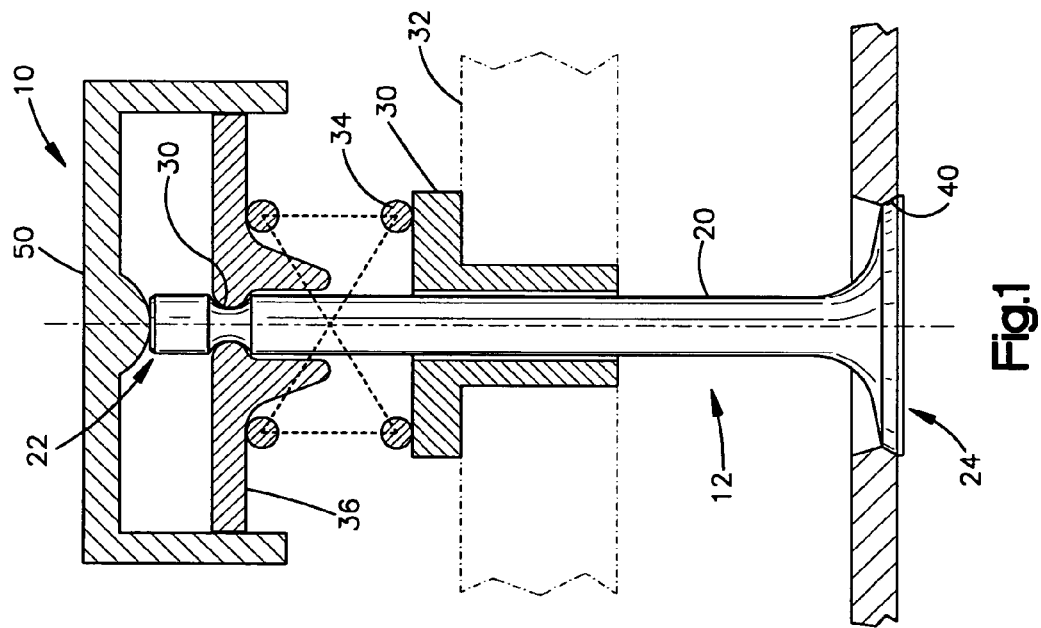

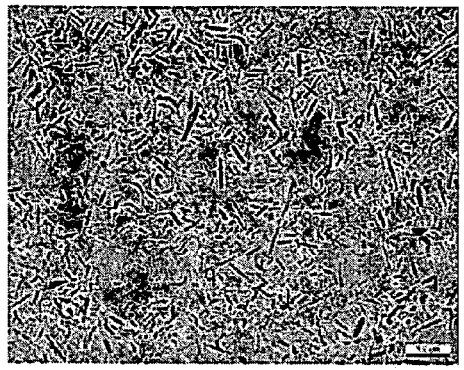
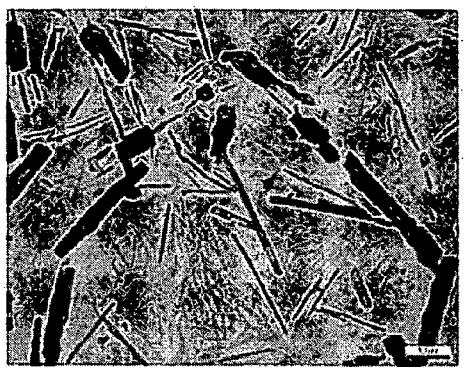
100:1     Alloy as cast     1000:1
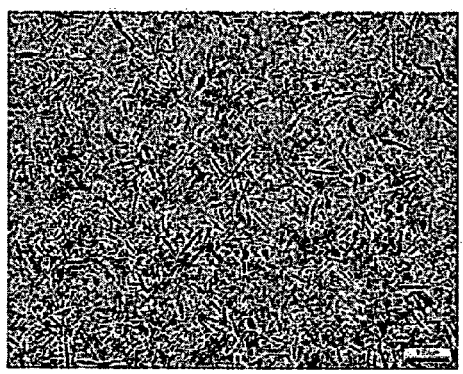
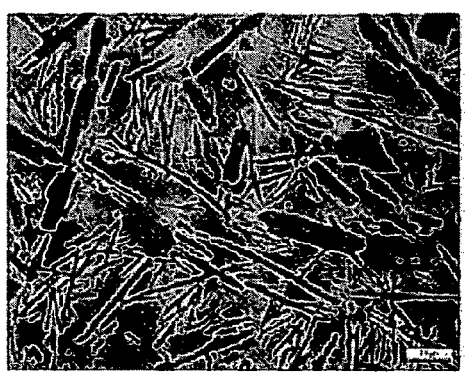
100:1     Alloy aged for 100 hours at 600 C     100:1
Fig. 4

100:1     Alloy as cast     1000:1
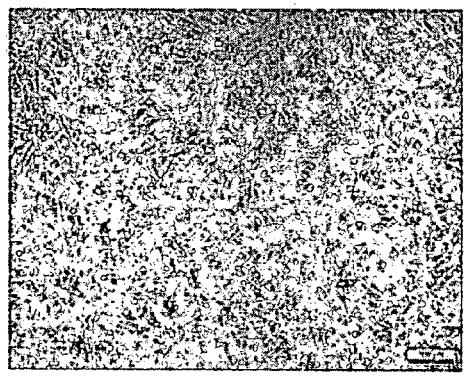
100:1     Alloy aged for 1000 hours at 600 C     1000:1
Fig. 5

AUSTENITIC IRON-BASED ALLOY

FIELD OF THE INVENTION

The present invention relates to an austenitic iron-based alloy and to the use of the austenitic iron-based alloy as an overlay material for a metal substrate of an internal combustion engine.

BACKGROUND OF THE INVENTION

Reciprocating engine valves, or poppet valves, for use in internal combustion engines are known. Poppet valves are used as both intake and exhaust valves. Such valves can include an overlaid valve face that is designed to abut a valve seat. The overlaid valve face can have properties including wear resistance, heat resistance and thermal shock resistance over a wide temperature that ranges from room temperature (e.g., about 75° F.) to elevated temperatures (e.g., 600° C.).

U.S. Pat. No. 6,248,292 discloses an alloy that is overlaid on a valve face. The alloy comprises, by weight, 20-60% Mo, 0.2-3% C, 5-40% Ni, 15-40% Co, 1-10% Cr, and the balance Fe and unavoidable impurities.

U.S. Pat. No. 6,702,905 discloses an iron-based alloy that can be used to form a valve seat. The iron-based alloy comprises by weight about 0.005% to 0.5% boron, about 1.2 to 1.8% carbon, about 0.7% to 1.5% vanadium, about 7 to 11% chromium, about 1% to about 3.5% niobium, about 6% to 11% molybdenum, and the balance including iron and incidental impurities.

De 197 33 306 discloses an iron based alloy used for thermal coating of components exposed to friction. The alloy comprises, by weight, 15% to 40% manganese, 0.1% to 30% chromium, 0.1% to 8% silicon, 0.1% to 6% silicon, 0.1% to 6% nickel, less than 0.1% aluminum, less than 0.2% carbon, less than 7% boron, less than 0.05% sulfur, less than 0.05% phosphorous, less than 5% molybdenum, less 6% niobium, less than 6% vanadium, less than 12% tungsten, and the balance iron.

SUMMARY OF THE INVENTION

The present invention relates to an austenitic iron-based alloy comprising, by weight, about 0.25% to about 0.9% carbon, about 1.5% to about 3.5% boron, about 1% to about 2% silicon, at least about 20% chromium, an amount of manganese effective to provide the iron-based alloy with an austenitic structure, and the balance including iron and incidental impurities.

The austenitic iron-based alloy can be used as a hard facing for a metal substrate. The hard facing can be applied to the metal substrate by a weld overlay process. The hard facing can increase the wear resistance and heat resistance of the metal substrate.

In one aspect of the invention the metal substrate can comprise a valve for an internal combustion engine. The austenitic iron-based alloy can be provided as a hard facing on the valve seat face of the valve. The austenitic iron-based alloy applied to the valve seat face can substantially improve the hot hardness, wear resistance, and extend the operation life of the valve.

BRIEF DESCRIPTION OF THE DRAWINGS

The foregoing and other features of the invention will become more apparent to one skilled in the art upon consideration of the following description of the invention and the accompanying drawings in which:

FIG. 1 illustrates a schematic sectional view of a valve assembly for an internal combustion engine in accordance with an aspect of the present invention;

FIG. 2 illustrates a schematic sectional view of a valve head of a valve of FIG. 1; and FIG. 3 illustrates a flow diagram of a method of forming a hard facing on a valve in accordance with an aspect of the present invention.

FIG. 4 illustrates micrographs of the crystal structure of an iron-based alloy as cast and after exposure to 600° C. for 100 hours.

FIG. 5 illustrates micrographs of the crystal structure of an iron-based alloy as cast and after exposure to 600° C. for 1000 hours.

DESCRIPTION

The present invention relates to an austenitic iron-based alloy. By austenitic it is meant that the iron-based alloy comprises an austenite structure at room temperature (e.g., about 75° F.). The austenite structure comprises a solid solution of one or more elements in face-centered cubic iron (i.e., gamma iron).

In accordance with one aspect of the invention, the austenitic iron-based alloy can comprise, by weight, about 0.25% to about 0.9% carbon, about 1.5% to about 3.5% boron, about 1% to about 2% silicon, at least about 20% chromium, an amount of manganese effective to provide the iron-based alloy with an austenitic structure, and the balance including iron and incidental impurities.

The carbon is an austenite former and can be combined with metals (e.g., Fe) in the austenitic iron-based alloy in a solid solution. The carbon can also increases the hardness, tensile strength, and yield strength as well as the wear resistance of the austenitic iron-based alloy. The minimum carbon content of the austenitic iron-based alloy necessary to assure stability of the austenitic structure as well as to improve the hardness, strength, and wear resistance of the austenitic iron-based alloy is at least about 0.25% by weight carbon. As the weight percentage of carbon in the austenitic iron-based alloy increases, the austenitic iron-based alloy can become potentially more susceptible to embrittlement and can be provided with an excessively high hardness. The carbon can be provided in the austenitic iron-based alloy up to about 0.9% by weight to mitigate susceptibility to embrittlement and excessive hardness of the austenitic iron-based alloy.

The boron, which has a very low solubility in iron, can be used to achieve a high level of hot hardness. It is believed that small amounts of boron can potentially improve the strength and grain refinement of the austenitic iron-based alloy by forming metal borides, which are more stable than metal carbides. Excessive boron, however, can degrade the toughness of the austenitic iron-based alloy. The amount of boron necessary to improve the hot hardness and strength of the austenitic iron-based alloy can be at least about 1.5% by weight. The boron can be provided in the austenitic iron-based alloy up to about 3.5% by weight without the toughness of the austenitic iron-based alloy being substantially degraded.

The silicon can produce an increase in the strength and the oxidation resistance of the austenitic iron-based alloy. The silicon can be present in the austenitic iron-based alloy in an amount of at least about 1% by weight. The silicon content should not exceed about 2% by weight because at amounts above about 2% by weight silicon the strength and toughness of the austenitic iron-based alloy can potentially degrade.

The chromium provides a desirable combination of corrosion resistance, hardenability, wear resistance and oxidation resistance to the austenitic iron-based alloy. The chromium can be included in the austenitic iron-based alloy in an amount of at least about 20% by weight. By way of example, the iron based alloy can include, by weight, about 20% to about 35% chromium.

The manganese is an austenite former and in combination with carbon and other potentially included austenite-forming alloying elements (i.e., austenite formers) provides the austenitic iron-based alloy of the present invention with its austenitic structure. The manganese can also increase the strength and ductility of the austenitic iron-based alloy. The manganese is included in the austenitic iron-based alloy in an amount effective to provide the austenitic iron-based alloy with an austenitic structure. This amount can vary depending on the amount of other austenite formers included in the austenitic iron-based alloy. For example, where only incidental amounts (e.g., less about 0.25 wt. %) of other austenite formers, such as nickel, cobalt, and copper, are included in the austenitic iron-based alloy, the amount of manganese required to provide the austenitic iron-based alloy with its austenitic structure is at least about 18% by weight of the austenitic iron-based alloy.

In one embodiment of the invention, where only incidental amounts of other austenite formers are included, the austenitic iron-based alloy can include, by weight, about 18% to about 30% manganese to provide the austenitic iron-based alloy with it austenitic structure.

The austenitic iron-based alloy can include less than about 18% manganese as long as other austenite formers, such as nickel, cobalt, and copper, are substituted for the manganese. Austenite formers, such as nickel, cobalt, and copper, are typically more expensive than manganese and when used in the austenitic iron-based alloy substantially increase the cost of the austenitic iron-based alloy. It is therefore desirable to minimize the amounts of these austenite formers in the austenitic iron-based alloy.

In one aspect of the invention, the iron-based alloy can include by weight less about 5% of these other austenite formers (e.g., nickel, cobalt, and copper). In another aspect of the invention, the austenitic iron-based alloy is substantially free of nickel, cobalt, and copper. By substantially free in this aspect, it is meant that the austenitic iron-based alloy is devoid of nickel, cobalt, and copper except for small amounts that may be included in the iron-based alloy in the form of impurities and that do not materially affect the austenitic structure of the austenitic iron-based alloy.

The balance of the austenitic iron-based alloy can be iron and incidental impurities and diluents. The incidental impurities can include trace amounts (e.g., up to about 0.4% each) of sulfur, nitrogen, phosphorous, and/or oxygen. The incidental impurities can also include carbide-forming alloying elements, such as molybdenum, titanium, vanadium, and tungsten, and other austenite formers, such as nickel, cobalt, and copper. These elements can be included in the austenitic iron-based alloy in an amount effective to improve the wear resistance and corrosion resistance of the austenitic iron-based alloy without adversely affecting the stability of the austenitic structure. The incidental impurities can include still other elements, such as calcium, lead, niobium, aluminum, and tin, in amounts (e.g., less than about 0.4 wt. %) that do not adversely the corrosion, wear, hardness, and austenitic properties of the austenitic iron based alloy. The diluents can include trace amount of elements that diffuse from a base alloy to the austenitic iron-based alloy when the austenitic iron-based alloy is used a hard facing for the base alloy.

One example of a particular austenitic iron-based alloy in accordance with the present invention includes, by weight, about 0.25% to about 0.9% carbon, about 1.5% to about 3.5% boron, about 1% to about 2% silicon, at least about 18% manganese, at least about 20% chromium, and the balance including iron and incidental impurities.

Another example of a particular austenitic iron-based alloy in accordance with the present invention includes, by weight, about 0.25% to about 0.9% carbon, about 1.5% to about 3.5% boron, about 1% to about 2% silicon, about 18% to about 30% manganese, about 20% to about 35% chromium, and the balance including iron and incidental impurities.

Yet another example of a particular austenitic iron-based alloy in accordance with the present invention can consist essentially of, by weight, about 0.25% to about 0.9% carbon, about 1.5% to about 3.5% boron, about 1% to about 2% silicon, about 18% to about 30% manganese, about 20% to about 35% chromium, and the balance including iron and incidental impurities.

The austenitic iron-based alloy in accordance with the present invention is resistant to wear and corrosion as maintains its austenitic crystal structure at temperatures ranging from about 400° C. to about 900° C. Moreover, the austenitic iron-based alloy has a hot hardness and high temperature fatigue resistance that allows it to be used in hard facing applications, such as a hard facing for a metal substrate of an internal combustion engine component. When used as a hard facing for a metal substrate, the austenitic iron-based alloy can substantially increase the hot hardness as well as resistance of the metal substrate to wear, corrosion, and heat.

In an aspect of the invention the metal substrate can comprise an engine valve for a valve assembly of an internal combustion engine. FIG. 1 illustrates an exemplary engine valve assembly 10 in accordance with the present invention. The engine valve 12 comprises a rod-shaped valve stem 20 that interconnects a valve tip 22 and a valve head 24. The valve stem 20 can be formed in one-piece with the valve head 24 and the valve tip 22. The valve stem 20 also includes an annular groove 30 adjacent the valve tip 22.

The valve 12 can be formed from one or more base metals. The metals can be selected according to whether the valve 12 is an intake or an exhaust valve. Generally, a stainless steel can be used to form an exhaust valve, while a carbon steel can be used to form an intake valve. An example of a stainless steel that can be used to form an exhaust valve is AISI No. 21-2 PH stainless steel. An example of a carbon steel that can form the intake valve is AISI No. 1541 carbon steel.

Other metals, which are well known in the art for valve formation, can be used to form the valve or at least a portion of the valve 12 of the present invention. For example, AISI No. 4140 steel can be used to form the valve tip 22 in accordance with the present invention.

The valve 12 can be positioned within a valve guide 30 of an engine block 32. The valve stem 20 stem extends through the valve guide 30 and is operative to move reciprocally relative to the valve guide 30. A valve spring 34 extends about the valve stem 20. The valve spring 34 engages a spring retainer 36 that is secured in the groove 30. The spring retainer 36 transmits pressure from the spring 34 to the valve head 24 to press the valve 12 to a closed position against a valve seat 40.

A valve tappet 50 engages the valve tip 22. Displacement of the valve tappet 50 causes the valve head 24 to be displaced from the valve seat 40 within the engine cylinder to an open position. Pressure from the spring 34 can force the valve head 24 to reseat.

Referring also to FIG. 2, the valve head 24 has a generally disc shape and includes an annular outer surface 60. The annular outer surface 60 is beveled to form an annular valve face 62 that engages the valve seat 40 during movement of the valve 12.

The valve face 62 includes a hard facing that is fusion bonded to the base metal of the valve face 62. The hard facing is formed by applying the austenitic iron-based alloy of the present invention to the base metal of the valve face 62. A hard facing formed from the austenitic iron-based alloy of the present invention has a higher hot hardness, corrosion resistance, and wear resistance than the base metal of the valve 12 and can substantially improve the maximum hot hardness, maximum corrosion resistance, maximum wear resistance, and operation life of the valve 12.

The austenitic iron-based alloy can be applied to the base metal of the valve face 62 using a weld overlay process to form a hard facing weld overlay. Examples of weld overlay processes that can be used to apply the austenitic iron-based alloy include shielded metal arc welding, open-arc welding, gas metal-arc welding, gas tungsten arc welding, plasma-transfer arc welding, oxyacetylene welding, and laser welding.

FIG. 3 is a schematic flow diagram illustrating a method 100 of forming a hard facing on a valve face of an engine valve using a weld overlay process. In the method, at 110, an engine valve is provided. The engine valve can be formed, for example, by hot forging or cold forming a metal, such as a stainless steel, a carbon steel, or a low-carbon steel, into the shape of an engine valve, such as the engine valve shown an described with respect to FIG. 1.

At 120, an austenitic iron-based alloy in accordance with the present invention is provided. In one aspect of the invention, the austenitic iron-based alloy can comprise, by weight, about 0.25% to about 0.9% carbon, about 1.5% to about 3.5% boron, about 1% to about 2% silicon, at least about 20% chromium, an amount of manganese effective to provide the iron-based alloy with an austenitic structure, and the balance including iron and incidental impurities.

In another aspect of the invention the austenitic iron-based alloy can include, by weight, about 0.25% to about 0.9% carbon, about 1.5% to about 3.5% boron, about 1% to about 2% silicon, at least about 18% manganese, at least about 20% chromium, and the balance including iron and incidental impurities.

In yet another aspect of the invention, the austenitic iron-based alloy can include, by weight, about 0.25% to about 0.9% carbon, about 1.5% to about 3.5% boron, about 1% to about 2% silicon, about 18% to about 30% manganese, about 20% to about 35% chromium, and the balance including iron and incidental impurities.

In a further aspect of the invention, the austenitic iron-based alloy can consist essentially of, by weight, about 0.25% to about 0.9% carbon, about 1.5% to about 3.5% boron, about 1% to about 2% silicon, about 18% to about 30% manganese, about 20% to about 35% chromium, and the balance including iron and incidental impurities.

The austenitic iron-based alloy can be provided in various forms, such a cast rod, wire, or a powder. The specific form in which the iron-based alloy is provided will depend on the specific welding process used to apply the austenitic iron-based alloy to the valve face. For example, where plasma arc-welding is used to apply the austenitic iron-based alloy, the austenitic iron-based alloy can be provided in the form of powder. In contrast, where shielded metal-arc welding is used to apply the austenitic iron-based alloy to the valve face, the austenitic iron-based alloy can be provide in the form of cast rod or wire.

At 130, the provided austenitic iron-based alloy can be applied to the valve face using a conventional welding process, such as arc welding (e.g., plasma transfer arc, shielded metal, and gas-tungsten), oxyacetylene welding, and laser welding. By way of example, a powder of austenitic iron-based alloy can be plasma welded to the valve face using an inert shielding gas (e.g., Ar) or a mixture of inert shield gases (e.g., Ar and N).

The austenitic iron-based alloy applied to the valve face by welding can fuse with the base metal that forms the valve face. As a result of the fusion and of the particular welding process, the composition of the fused austenitic iron-based alloy that forms the hard facing weld overlay will be slightly different than the composition of the austenitic iron-based alloy prior to welding. For example, if a nitrogen shielding gas is used during welding, the weight percentage of nitrogen in the hard facing weld overlay can be potentially greater than the weight percentage of nitrogen in the provided austenitic iron-based alloy. Further, at least some of the elements in the base metal can potentially diffuse into the hard facing weld overlay alloy to slightly modify the composition of the weld overlay. At least portions of the composition of the austenitic iron-based alloy will therefore depend on the particular processes used to apply the alloy and the particular composition of the weld.

Optionally, following welding of the austenitic iron-based alloy to the valve, the hard facing weld overlay so formed can be subjected to additional processes to modify the surface finish and mechanical properties of the hard facing. For example, the hard facing can be machined or ground to improve the surface finish of the hard facing. Moreover, the hard facing can be annealed for stress relief and to improve the mechanical properties (e.g., strength and hardness) of the hard facing. Additionally, the hard facing can be nitrided to modify the hardness of the hard facing. It will be appreciated that yet other processes can be used to further affect the properties of the hard facing.

The following example is included to demonstrate various aspects of the invention. Those of skill in the art should, in light of the present disclosure, appreciate that many changes can be made in the specific aspects which are disclosed and still obtain a like or similar result without departing from the spirit and scope of the invention.

EXAMPLES

Specimens of an austenitic iron-based alloy consisting essentially of, by weight, about 0.5% carbon, about 1.5% to about 3.5% boron, about 1% to about 2% silicon, about 18% to about 30% manganese, about 20% to about 35% chromium, and the balance including iron and incidental impurities were provided. The specimens also included 0.2% nitrogen to simulate nitrogen dilution from a base metal during a welding process.

The Vickers hardness (HV10) of each specimen (Examples 1-15) as cast was measured in accordance with ASTM E18 and DIN 50133. The hardness (HV 10) of each specimen was then measured after aging or heat treating the specimens at 600° C. for various lengths of time. Micrographs of the crystal structure of the specimens of the alloy as cast and after aging at 600° C. for the various lengths of time were also obtained. The 600° C. simulates the maximum expected temperature of a valve seat face during service. The as cast hardness measurement and the aged or heat treated hardness measurement for each specimen at the various exposure times was compared in the following Table.

TABLE

VICKERS HARDNESS

| Example | Hardness of As Cast Alloy | Exposure Hours at 600° C. | Hardness After Exposure to 600° C. |
| --- | --- | --- | --- |
| 1 | 447 | 8 | 459 |
| 2 | 444 | 24 | 450 |
| 3 | 450 | 48 | 450 |
| 4 | 450 | 72 | 446 |
| 5 | 436 | 96 | 442 |
| 6 | 445 | 168 | 451 |
| 7 | 500 | 192 | 497 |
| 8 | 504 | 336 | 504 |
| 9 | 501 | 408 | 516 |
| 10 | 513 | 504 | 509 |
| 11 | 492 | 600 | 512 |
| 12 | 516 | 696 | 505 |
| 13 | 500 | 792 | 505 |
| 14 | 505 | 936 | 519 |
| 15 | 498 | 1008 | 523 |

The Table shows that aging of the specimens at 600° C. for various lengths time does not adversely affect the hardness of the specimens and that the hardness of the alloy remains stable through the 1000 hour mark. In fact, specimens aged for longer durations of time (Example 14) had essentially the same difference in hardness (as cast v. after exposure hardness) as specimens aged for a shorter duration of time (Example 1). This behavior is unique for an alloy with relatively low carbon content (e.g., 0.5%). Additionally, the level of hardness achieved by exposure to 600° C. is remarkable as compared to the hardness of cobalt-based stellite alloys. Cobalt based stellite alloys have a hardness in the range of 420 HV to 480 HV and rely on a much higher carbon content to maintain their harness.

FIGS. 4 and 5 show micrographs of the crystal structure of a first specimen and a second specimen iron-based alloy as cast and after heat treating at 600° C. for, respectively, 100 hours and 1000 hours. Comparison of the as cast and after exposure micrographs for each specimen shows that the microstructure of the iron-based alloy does not degrade after 100 hours and after 1000 hours. The lack of degradation of the iron-based alloy after aging for 1000 hours qualifies this alloy for both light-duty and heavy-duty applications. Typical engine test durations are 300-500 hrs for automotive and 1000 hrs for heavy duty truck.

From the above description of the invention, those skilled in the art will perceive improvements, changes, and modifications. Such improvements, changes and modifications within the skill of the art are intended to be covered by the appended claims.

Having described the invention, the following is claimed:

1. A method of forming hard facing on an engine valve, the method comprising:
    providing an engine valve;
    providing an austenitic iron-based alloy, the austenitic iron-based alloy including, by weight, about 0.25% to about 0.9% carbon, about 1.5% to about 3.5% boron, about 1% to about 2% silicon, at least 20% chromium, an amount of manganese effective to provide the iron-based alloy with an austenitic structure, and the balance including iron and incidental impurities; and
    welding the austenitic iron-based alloy to at least a portion of the engine valve.

2. The method of claim 1, the austenitic iron-based alloy being substantially free of nickel.

3. The method of 1, the austenitic iron-based alloy comprising about 18 wt % to about 30 wt. % of manganese and the chromium comprising 20 wt. % to about 35 wt. % of the austenitic iron-based alloy.

4. The method of claim 1, the austenitic iron-based alloy being provided on at least a portion of the valve by plasma transfer arc welding.

5. The method of claim 1, the valve including a valve face and the austenitic iron-based alloy being provided on the valve face to form the hard facing.

* * * * *